US011075923B1

(12) United States Patent
Srinivasan et al.

(10) Patent No.: US 11,075,923 B1
(45) Date of Patent: Jul. 27, 2021

(54) METHOD AND APPARATUS FOR ENTITY-BASED RESOURCE PROTECTION FOR A CLOUD-BASED SYSTEM

(71) Applicant: Zscaler, Inc., San Jose, CA (US)

(72) Inventors: Subramanian Srinivasan, Milipitas, CA (US); Arvind Nadendla, San Jose, CA (US)

(73) Assignee: Zscaler, Inc., San Jose, CA (US)

( * ) Notice: Subject to any disclaimer, the term of this patent is extended or adjusted under 35 U.S.C. 154(b) by 0 days.

(21) Appl. No.: 16/886,882

(22) Filed: May 29, 2020

(51) Int. Cl.
| | | |
|---|---|---|
| *G06F 15/16* | (2006.01) | |
| *G06F 15/173* | (2006.01) | |
| *H04L 12/815* | (2013.01) | |
| *H04L 12/825* | (2013.01) | |
| *H04L 29/06* | (2006.01) | |
| *G06F 9/54* | (2006.01) | |
| *H04L 12/24* | (2006.01) | |
| *H04L 29/08* | (2006.01) | |

(52) U.S. Cl.
CPC .......... *H04L 63/108* (2013.01); *G06F 9/547* (2013.01); *H04L 41/0893* (2013.01); *H04L 41/0896* (2013.01); *H04L 63/1458* (2013.01); *H04L 63/20* (2013.01); *H04L 67/10* (2013.01)

(58) Field of Classification Search
CPC ..... H04L 63/08; H04L 63/1458; H04L 63/29; H04L 41/0893; H04L 41/0896; H04L 67/10; G06F 9/547
USPC .......................................................... 726/1
See application file for complete search history.

(56) References Cited

U.S. PATENT DOCUMENTS

| | | | |
|---|---|---|---|
| 8,010,526 B1 | 8/2011 | Kailash et al. | |
| 8,024,782 B2 | 9/2011 | Kailash et al. | |
| 8,484,726 B1 | 7/2013 | Sutton | |
| 8,656,462 B2 | 2/2014 | Kailash et al. | |
| 10,021,081 B2 * | 7/2018 | Toomey | G06F 21/33 |
| 10,375,024 B2 | 8/2019 | Foxhoven et al. | |
| 10,616,180 B2 | 4/2020 | Chanak et al. | |
| 2009/0106821 A1 * | 4/2009 | Kothari | G06F 21/10 726/3 |
| 2013/0212603 A1 * | 8/2013 | Cooke | G06F 9/542 719/328 |
| 2018/0352053 A1 * | 12/2018 | Kosim-Satyaputra | H04L 67/02 |
| 2019/0268442 A1 * | 8/2019 | Puniani | G06F 9/54 |
| 2020/0028788 A1 * | 1/2020 | Chen | H04L 41/0896 |
| 2020/0044972 A1 * | 2/2020 | Harp | G06F 16/90335 |

* cited by examiner

*Primary Examiner* — Ruolei Zong
(74) *Attorney, Agent, or Firm* — Clements Bernard Walker; Lawrence A. Baratta, Jr.; Jacob P. Beers

(57) ABSTRACT

Systems and methods for limiting calls to access a cloud-based system are disclosed. The systems and methods obtain a rate limiting policy including at least one attribute and a counting interval, the at least one attribute including at least one of a username associated with a client, an instance, an organization associated with the client, a resource being requested, a service being requested, a geographical access region, and an Application Programming Interface (API) being requested. The systems and methods also mark an entry, based on the rate limiting policy, in a database for each call the client makes. The systems and methods further enforce the rate liming policy by not processing calls from the client associated with the at least one attribute that are made for a count of calls marked that is beyond the counting interval.

20 Claims, 6 Drawing Sheets

METHOD AND APPARATUS FOR ENTITY-BASED RESOURCE PROTECTION FOR A CLOUD-BASED SYSTEM

FIELD OF THE DISCLOSURE

The present disclosure relates generally to networking and computing. More particularly, the present disclosure relates to a method and an apparatus for entity-based resource protection for a cloud-based system.

BACKGROUND OF THE DISCLOSURE

Configuration and management systems, such as a cloud-based system, are primarily accessed through Application Programming Interfaces (APIs) either from a user interface (UI) or scripted from custom management systems. In order to grant access to users, the APIs are exposed to the public internet and are accessible primarily through access tokens.

Once an access token is obtained for a system, the system can be flooded with access requests. Such flooding can be unintentional, such as requests being performed by an over aggressive client or can be intentionally triggered to nefariously interfere with the system, such as flooding requests from one or more sources to effectuate a Denial of Service (DoS) attack.

Similarly, a client may attempt to access the system via brute force by making hundreds of requests in an attempt to ascertain a username and/or password for the system.

By processing each of these requests, a system can be overwhelmed or be prevented from processing the requests of other users and clients, which can prevent the other users and clients from accessing the system when the system is flooded with requests.

BRIEF SUMMARY OF THE DISCLOSURE

The present disclosure relates to entity-based resource protection for a cloud-based system that limits calls to access a cloud-based system. In particular, a rate limiting policy defined by at least one attribute including one or more of a username, instance, organization, resource, service, access region, and API along with a counting interval, that is configured to be dynamically updated, is used to limit a number of calls a client, associated with the at least one attribute, can make within a predetermined time interval. The rate limiting policy can be used to protect the cloud-based system from brute force and DoS attacks.

In one embodiment, the present disclosure provides a method for limiting calls to access a cloud-based system. The method includes obtaining a rate limiting policy including at least one attribute and a counting interval, the at least one attribute including at least one of a username associated with a client, an instance, an organization associated with the client, a resource being requested, a service being requested, a geographical access region, and an API being requested. The method also includes marking an entry, based on the rate limiting policy, in a database for each call the client makes. The method further includes enforcing the rate liming policy by not processing calls from the client associated with the at least one attribute that are made for a count of calls marked that is beyond the counting interval.

In one embodiment, the rate limiting policy further includes at least one of a priority of the rate limiting policy, an IP address, and a policy scope.

In another embodiment, the rate limiting policy includes a general rate limiting policy that applies rate limits to the cloud-based system and at least one of a customer rate limiting policy that applies rate limits to a customer and associated clients of the customer and a user rate limiting policy that applies rate limits to a specific user.

In a further embodiment, the method further includes dynamically updating the rate limiting policy based on a received request that includes the addition or removal of at least one attribute and a counting interval associated with the at least one attribute.

In yet another embodiment, the method further includes switching, temporarily, to a pure counting mode and not enforcing the call limits defined by the counting interval and recording all of the calls made to the APIs to determine a potential number of calls made to the APIs by clients of the cloud-based system.

In yet a further embodiment, the count of the call occurs from a first occurrence of the call. Optionally, the database comprises an in-memory key-value database and each entry is marked in a sliding log window.

In another embodiment, the present disclosure provides a non-transitory computer-readable storage medium having computer-readable code stored thereon for programming a node of a cloud-bases system to perform steps of: obtain a rate limiting policy including at least one attribute and a counting interval, the at least one attribute including at least one of a username associated with a client, an instance, an organization associated with the client, a resource being requested, a service being requested, a geographical access region, and an application programming interface (API) being requested; mark an entry, based on the rate limiting policy, in a database for each call the client makes; and enforce the rate liming policy by not processing calls from the client associated with the at least one attribute that are made for a count of calls marked that is beyond the counting interval.

In a further embodiment, the present disclosure provides a server in a cloud-based system. The server includes a network interface, a processor, and a memory. The network interface is communicatively coupled to a network. The processor is communicatively coupled to the network interface. The memory stores computer-executable instructions that, when executed, cause the processor to: obtain a rate limiting policy including at least one attribute and a counting interval, the at least one attribute including at least one of a username associated with a client, an instance, an organization associated with the client, a resource being requested, a service being requested, a geographical access region, and an application programming interface (API) being requested; mark an entry, based on the rate limiting policy, in a database for each call the client makes; and enforce the rate liming policy by not processing calls from the client associated with the at least one attribute that are made for a count of calls marked that is beyond the counting interval.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of a server which may be used in the cloud-based system of FIGS. 1 and 2 or the like;

FIG. 4 is a block diagram of a user device which may be used with the cloud-based system of FIGS. 1 and 2 or the like;

DETAILED DESCRIPTION OF THE DISCLOSURE

Again, the present disclosure relates to entity-based resource protection for a cloud-based system. The access control, including the API(s) for access control, of the cloud-based system can be flooded with requests unintentionally by an over aggressive client or intentionally for nefarious purposes. Resource access based on a number of requests coming in is applied to all public services to protect against DoS attacks by ensuring that clients are limited to a certain number of access requests in a given timeframe.

For example if there are hundreds of login requests from a single client, it can be assumed that the client is attempting to brute force the username/password and as such, processing of those login requests is denied, by the access control, for the client, but the access control processing login requests from other clients is continued.

Currently, the client identity is generally established using the client's Internet Protocol (IP) address and rate-limiting is configured for that IP address. However, in some instances, the client can use multiple IP addresses, which can limit the use of setting a rate-limit via the IP address. As such, the rate-limiting policy for the access control is set using one or more other attributes to establish the identity of the client and to apply the rate-limiting policy. For example, the rate-limit can be established by one or more of a username, instance, organization, resource, service, access region, API, and the like. Of course, the attributed for the rate-limiting policy can be anything including user-defined attributes, new attributes, etc. By applying the rate-limiting policy using one or more of these attributes, the individual API endpoints of the cloud-based system are protected from excessive short-term spikes in traffic from unintentionally aggressive clients of the API and from nefarious actors attempting to deny service or gain access to the cloud-based system.

Which attributes are being applied to the rate-limiting policy can be changed dynamically, allowing for robust and flexible control of the cloud-based system. Such control of the cloud-based system allows for adjustments to be made quickly in response to a particular threat and for individual policy adjustments for customers and users of the cloud-based system based on the needs of those customers and users without changing the underlying code for policy enforcement.

Example Cloud-Based System Architecture

Figure 1:
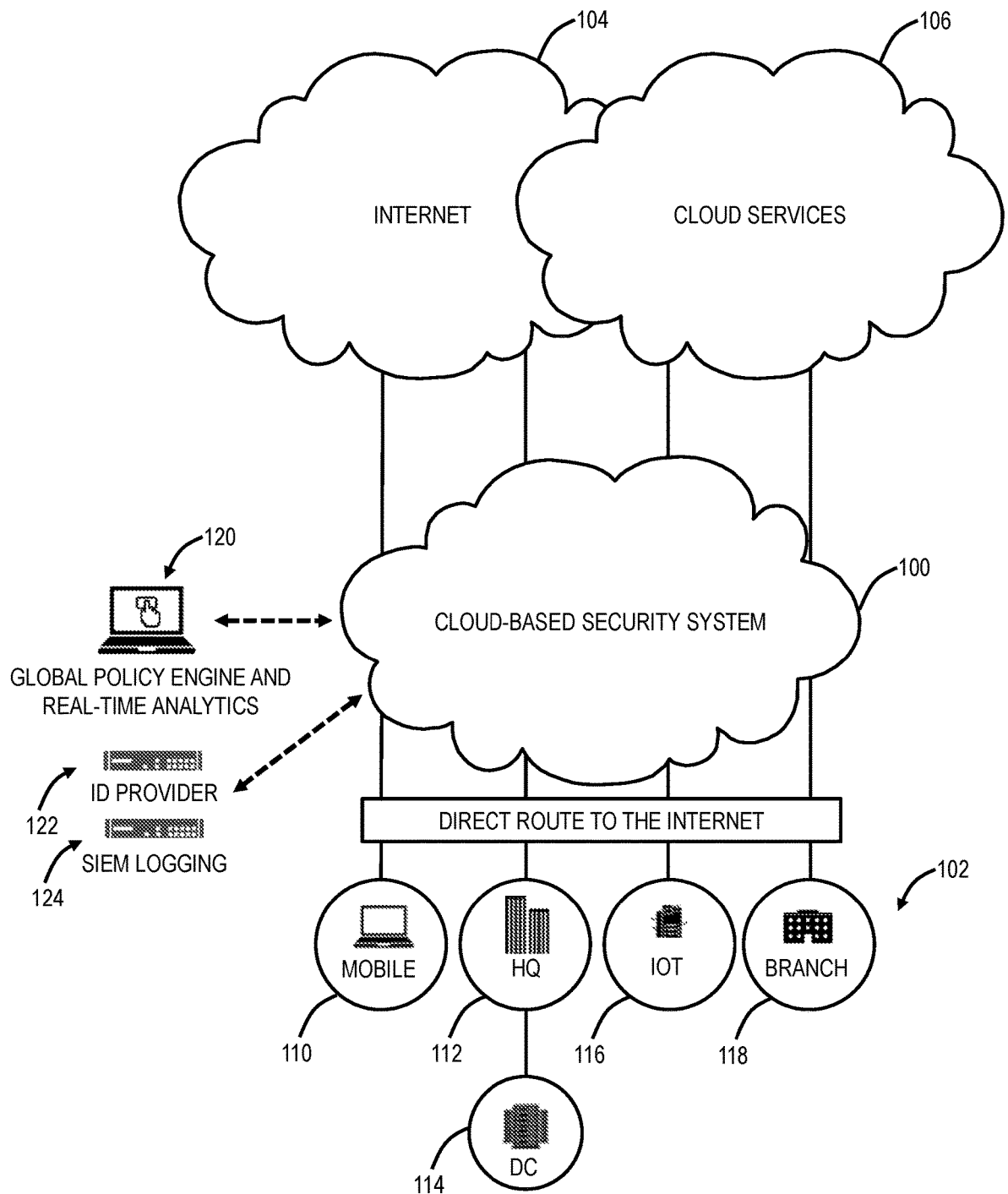
FIG. 1 is a network diagram of a cloud-based system offering security as a service.

FIG. 1 is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. The DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, anti-malware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near zero latency on the users 102. The cloud application security can include CASB functionality to discover and control user access to known and unknown cloud services 106. The file type controls enable true file type control by user, location, destination, etc. to determine which files are allowed or not.

Figure 4:
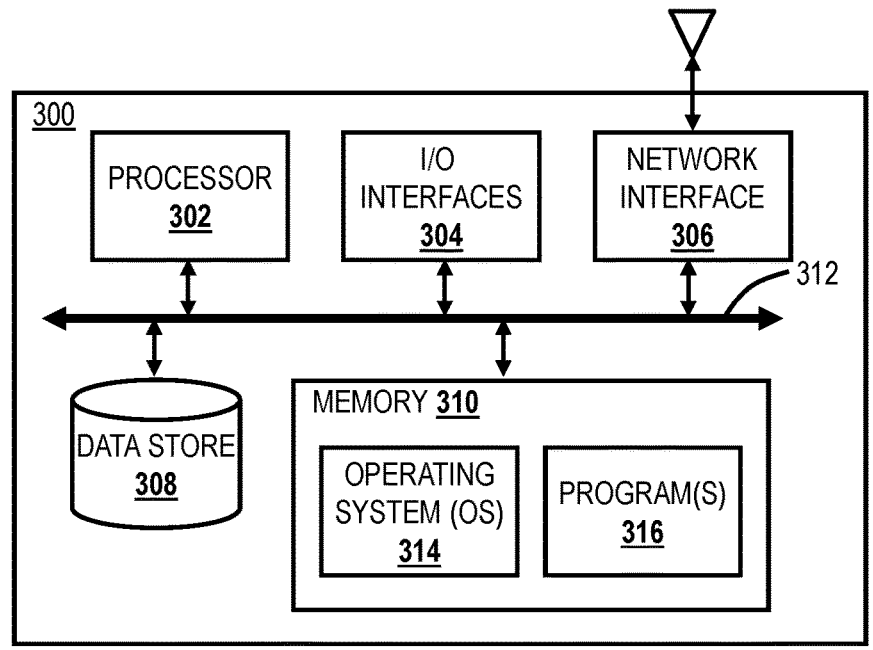

For illustration purposes, the users 102 of the cloud-based system 100 can include a mobile device 110, a headquarters (HQ) 112 which can include or connect to a data center (DC) 114, Internet of Things (IoT) devices 116, a branch office 118, etc., and each includes one or more user devices (an example user device 300 is illustrated in FIG. 4). The devices 110, 116 and the locations 112, 114, 118 are shown for illustrative purposes, and those skilled in the art will recognize there are various access scenarios and other users 102 for the cloud-based system 100, all of which are contemplated herein. The users 102 can be associated with a tenant which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Further, the cloud-based system 100 can be multi-tenant with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies with policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 106) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118 and via the devices 110, 116 and the cloud-based system 100. Typically, the locations 112, 114, 118 can use tunneling where all traffic is forward through the cloud-based system 100. For example, various tunneling protocols are contemplated such as Generic Routing Encapsulation (GRE), Layer Two Tunneling Protocol (L2TP), IP Security (IPsec), customized tunneling protocols, etc. The devices 110, 116, when not at one of the locations 112, 114, 118 can use a local application that forwards traffic, a proxy such as via a Proxy Auto Config (PAC) file, and the like. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and corelate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Figure 2:
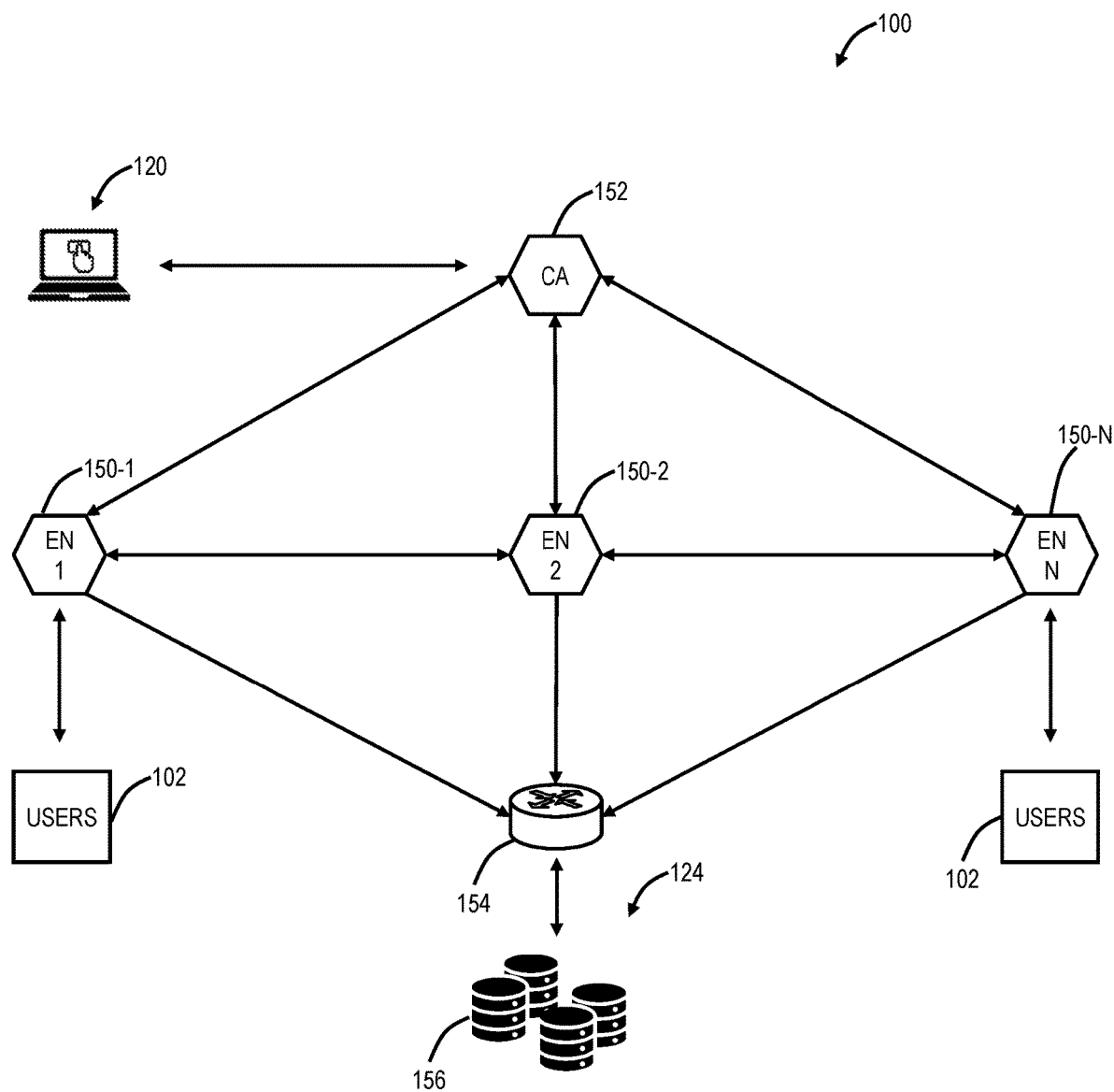
FIG. 2 is a network diagram of an example implementation of the cloud-based system.
Figure 3:
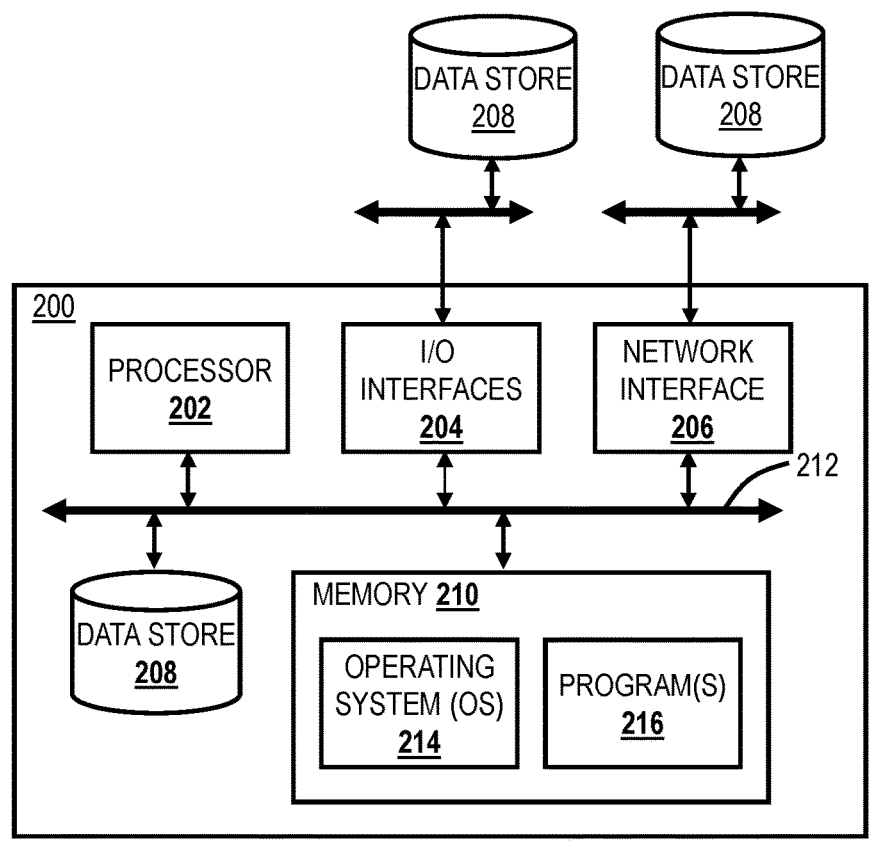

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150, 152, while described as nodes, can include one or more servers including physical servers, virtual machines (VM) executed on physical hardware, etc. An example of a server is illustrated in FIG. 3. The cloud-based system 100 further includes a log router 154 that connects to a storage cluster 156 for supporting log maintenance from the enforcement nodes 150. The central authority 152 provide centralized policy, real-time threat updates, etc. and coordinates distribution of this data between the enforcement nodes 150. The enforcement nodes 150 provide an onramp to the users 102, typically via an API, and are configured to execute policy, based on the central authority 152, for each user 102. The enforcement nodes 150 can be geographically distributed and the policy for each user 102 follows that user 102 as he or she connects to the nearest (or other criteria) enforcement node 150.

The enforcement nodes 150 are full-featured secure internet gateways that provide integrated internet security. They inspect all web traffic bi-directionally for malware and enforce security, compliance, and firewall policies, as described herein. In an embodiment, each enforcement node 150 has two main modules for inspecting traffic and applying policies: a web module and a firewall module. The enforcement nodes 150 are deployed in around the world and can handle hundreds of thousands of concurrent users with millions of concurrent sessions. Because of this, regardless of where the users 102 are, they can access the Internet 104 from any device and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100 and the enforcement nodes 150 can be configured to never store any data to disk. Packet data is held in memory for inspection and then, based on policy, is either forwarded or dropped. Log data generated for every transaction is compressed, tokenized, and exported over secure TLS connections to the log routers 154 that direct the logs to the storage cluster 156, hosted in the appropriate geographical region, for each organization.

The central authority 152 hosts all customer (tenant) policy and configuration settings. It monitors the cloud and provides a central location for software and database updates, and threat intelligence. Given the multi-tenant architecture, the central authority 152 is redundant and backed up in multiple different data centers. The enforcement nodes 150 establish persistent connections to the central authority 152 in order to download all policy configurations. When a new user connects to an enforcement node 150, such as via an API, a policy request is sent to the central authority 152 through this connection. The central authority 152 then calculates the policies that apply to that user 102 and sends the policy to the enforcement node 150 as a highly compressed bitmap.

Once downloaded, a tenant's policy is cached until a policy change is made in the management system 120. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's own on-premises servers. A cloud application, or cloud app, is a software program where cloud-based and local components work together. The cloud-based system 100 can be utilized to provide example cloud services including Zscaler Internet Access (ZIA), Zscaler Private Access (ZPA), and Zscaler Digital Experience (ZDX), all from Zscaler, Inc. (the assignee and applicant of the present application). The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources in lieu of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Example Server Architecture

FIG. 3 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chip-set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

User Device Application for Traffic Forwarding and Monitoring

Figure 5:
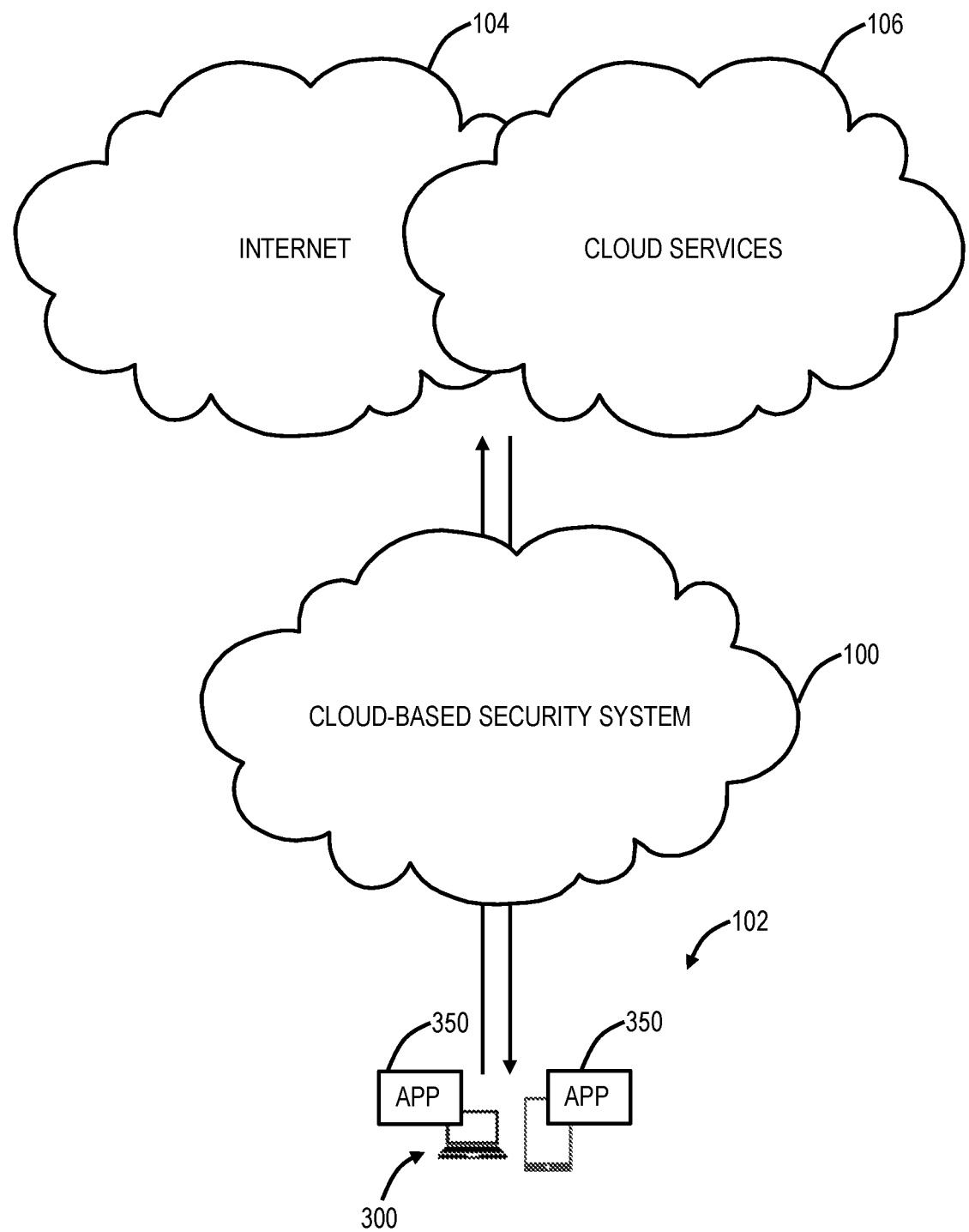
FIG. 5 is a network diagram of the cloud-based system illustrating an application on user devices with users configured to operate through the cloud-based system.

FIG. 5 is a network diagram of the cloud-based system 100 illustrating an application 350 on user devices 300 with users 102 configured to operate through the cloud-based system 100. Different types of user devices 300 are proliferating including Bring Your Own Device (BYOD) as well as IT-managed devices. The conventional approach for a user device 300 to operate with the cloud-based system 100 as well as for accessing enterprise resources includes complex policies, VPNs, poor user experience, etc. The application 350 can automatically forwards user traffic with the cloud-based system 100 as well as ensuring that security and access policies are enforced, regardless of device, location, operating system, or application. The application 350 automatically determines if a user 102 is looking to access the open Internet 104, a SaaS app or an internal app running in public, private or the datacenter and routes mobile traffic through the cloud-based system 100. The application 350 can support various cloud services including ZIA, ZPA, ZDX, etc., allowing the best in class security with zero trust access to internal apps.

The application 350 is configured to authenticate the user, such as with an access control via an API of the cloud-based system 100, and to auto-route traffic for seamless user experience. The access control can be implemented by the enforcement nodes 150 and/or the central authority 152. This can be protocol as well as application specific, and the application 350 can route traffic with a nearest or best fit enforcement node 150. Further, the application 350 can detect trusted networks, allowed applications, etc. and support secure network access. The application 350 can also support enrollment of the user device 300 prior to accessing applications. The application 350 can uniquely detect the users 102 based on fingerprinting the user device 300, using criteria like device model, platform, operating system, etc. The application 350 can support Mobile Device Management (MDM) functions, allowing IT personnel to seamlessly deploy and manage the user devices 300. This can also include automatic installation of client and SSL certificates during enrollment. Finally, the application 350 provides visibility into device and app usage of the user 102 of the user device 300.

The application 350 supports a secure, lightweight tunnel between the user device 300 and the cloud-based system 100. For example, the lightweight tunnel can be HTTP-based. With the application 350, there is no requirement for PAC files, an IPSec VPN, authentication cookies, or end user 102 setup.

Zero Trust Network Access Using the Cloud-Based System

Figure 6:
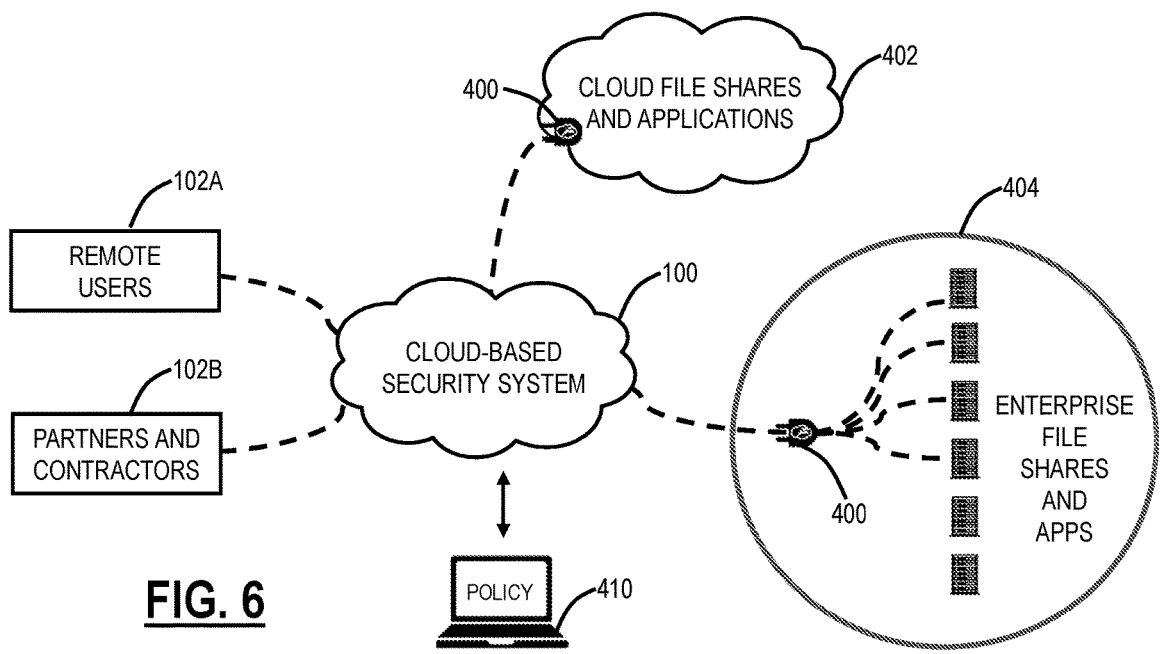
FIG. 6 is a network diagram of a Zero Trust Network Access (ZTNA) application utilizing the cloud-based system of FIGS. 1 and 2.

FIG. 6 is a network diagram of a Zero Trust Network Access (ZTNA) application utilizing the cloud-based system 100. For ZTNA, the cloud-based system 100 can dynamically create a connection through a secure tunnel between an end point (e.g., users 102A, 102B) that are remote and an on-premises connector 400 that is either located in cloud file shares and applications 402 and/or in an enterprise network 404, connected to enterprise file shares and applications. The connection between the cloud-based system 100 and on-premises connector 400 is dynamic, on-demand and orchestrated by the cloud-based system 100. A key feature is its security at the edge—there is no need to punch any holes in the existing on-premises firewall. The connector 400 inside the enterprise (on premises) "dials out" and connects to the cloud-based system 100 as if too were an end point. This on-demand dial-out capability and tunneling authenticated traffic back to the enterprise is a key differentiator for ZTNA. Also, this functionality can be implemented in part by the application 350 on the user device 300. The secure tunnel of connector 400 can be a lightweight tunnel, and can be, for example, HTTP-based.

The paradigm of virtual private access systems and methods is to give users network access to get to an application and/or file share, not to the entire network. If a user is not authorized to get the application, the user should not be able to even see that it exists, much less access it. The virtual private access systems and methods provide an approach to deliver secure access by decoupling applications 402, 404 from the network, instead providing access with a connector 400, in front of the applications 402, 404, an application on the user device 300, a central authority node 152 to push policy 410, and the cloud-based system 100 to stitch the applications 402, 404 and the software connectors 402, 404 together, on a per-user, per-application basis.

With the virtual private access, users can only see the specific applications 402, 404 allowed by the policy 410. Everything else is "invisible" or "dark" to them. Because the virtual private access separates the application from the network, the physical location of the application 402, 404 becomes irrelevant—if applications 402, 404 are located in more than one place, the user is automatically directed to the instance that will give them the best performance. The virtual private access also dramatically reduces configuration complexity such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy, because the virtual private access is a service offering to end users and enterprises. FIG. 5 can include the ZPA service from Zscaler, Inc.

Digital Experience Monitoring

Figure 7:
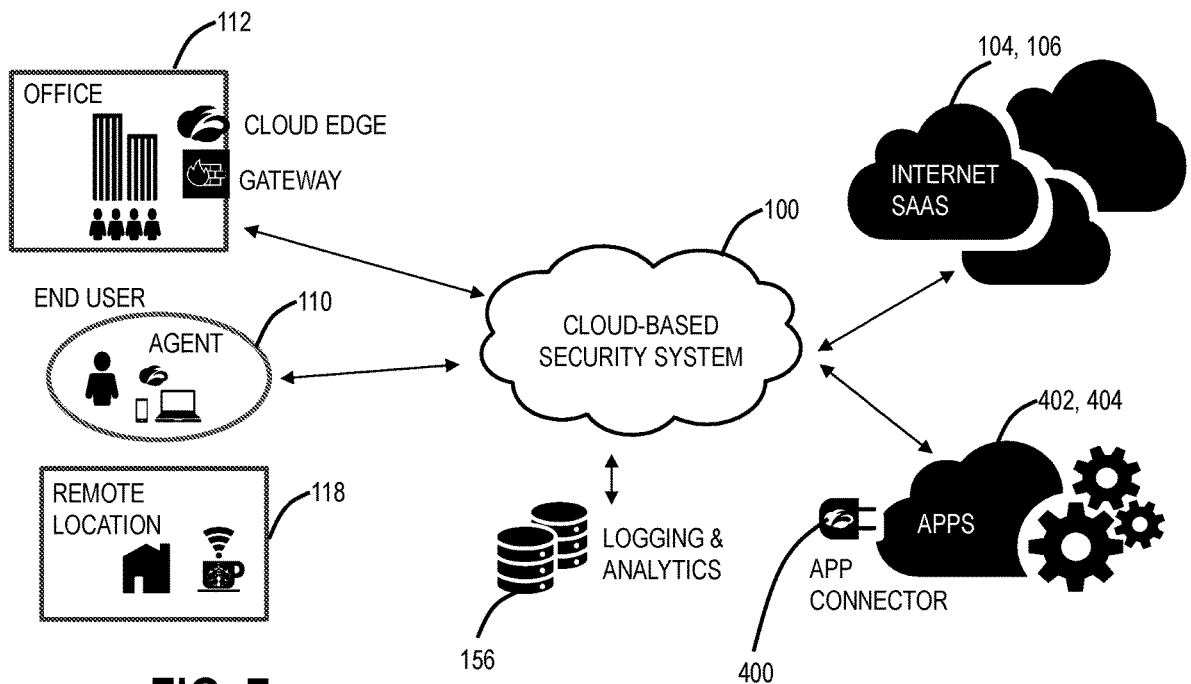
FIG. 7 is a network diagram of the cloud-based system of FIGS. 1 and 2 in an application of digital experience monitoring.

FIG. 7 is a network diagram of the cloud-based system 100 in an application of digital experience monitoring. Here, the cloud-based system 100 providing Security as a service as well as ZTNA can also be used as to provide real-time, continuous digital experience monitoring, as opposed to conventional approaches (synthetic probes). A key aspect of the architecture of the cloud-based system 100 is the inline monitoring. This means data is accessible in real-time for individual users from end-to-end. As described herein, digital experience monitoring can include monitoring, analyzing, and improving digital user experience.

The cloud-based system 100 connects users 102 at the locations 110, 112, 118 to the applications 402, 404, the Internet 104, the cloud services 106, etc. The inline, end-to-end visibility of all users enables digital experience monitoring. The cloud-based system 100 has the ability to monitor, diagnose, generate alerts, and perform remedial actions with respect to network endpoints, network components, network links, etc. The network endpoints can include servers, virtual machines, containers, storage systems, or anything with an IP address, including Internet of Things (IoT), cloud, and wireless endpoints. With these components, these network endpoints can be monitored directly in combination with a network perspective. Thus, the cloud-based system 100 provides a unique architecture that can enable digital experience monitoring, network application monitoring, infrastructure component interactions, etc. Of note, these various monitoring aspects require no additional components—the cloud-based system 100 leverages the existing infrastructure to provide this service.

Again, digital experience monitoring includes the capture of data about how end-to-end application availability, latency, and quality appear to the end user from a network perspective. This is limited to the network traffic visibility and not within components such as what application performance monitoring is able to accomplish. Networked application monitoring provides the speed and overall quality of networked application delivery to the user in support of key business activities. Infrastructure component interactions include a focus on infrastructure components as they interact via the network, as well as the network delivery of services or applications. This includes the ability to provide network path analytics.

The cloud-based system 100 can enable real-time performance and behaviors for troubleshooting in the current state of the environment, historical performance and behaviors to understand what occurred or what is trending over time, predictive behaviors by leveraging analytics technologies to distill and create actionable items from the large dataset collected across the various data sources, and the like. The cloud-based system 100 includes the ability to directly ingest any of the following data sources network device generated health data, network device generated traffic data, including flow-based data sources inclusive of NetFlow and IPFIX, raw network packet analysis to identify application types and performance characteristics, HTTP request metrics, etc. The cloud-based system 100 can operate at 10 gigabit (10G) Ethernet and higher at full line rate and support a rate of 100,000 or more flows per second or higher.

The applications 402, 404 can include enterprise applications, Office 365, Salesforce, Skype, Google apps, internal applications, etc. These are critical business applications where user experience is important. The objective here is to collect various data points so that user experience can be quantified for a particular user, at a particular time, for purposes of analyzing the experience as well as improving the experience. In an embodiment, the monitored data can be from different categories including application-related, network-related, device-related (also can be referred to as endpoint-related), protocol-related, etc. Data can be collected at the application 350 or the cloud edge to quantify user experience for specific applications, i.e., the application-related and device-related data. The cloud-based system 100 can further collect the network-related and the protocol-related data (e.g., Domain Name System (DNS) response time).

| Application-related data | |
| --- | --- |
| Page Load Time | Redirect count (#) |
| Page Response Time | Throughput (bps) |
| Document Object Model (DOM) | Total size |
| Load Time | (bytes) |
| Total Downloaded bytes | Page error count (#) |
| App availability (%) | Page element count by category (#) |

| Network-related data | |
| --- | --- |
| HTTP Request metrics | Bandwidth |
| Server response time | Jitter |
| Ping packet loss (%) | Trace Route |
| Ping round trip | DNS lookup trace |
| Packet loss (%) | GRE/IPSec tunnel monitoring |
| Latency | MTU and bandwidth measurements |

| Device-related data (endpoint-related data) | |
| --- | --- |
| System details | Network (config) |
| Central Processing Unit (CPU) | Disk |
| Memory (RAM) | Processes |
| Network (interfaces) | Applications |

Metrics could be combined. For example, device health can be based on a combination of CPU, memory, etc. Network health could be a combination of Wi-Fi/LAN connection health, latency, etc. Application heath could be a combination of response time, page loads, etc. The cloud-based system 100 can generate service health as a combination of CPU, memory, and the load time of the service while processing a user's request. The network health could be based on the number of network path(s), latency, packet loss, etc.

The connector 400 can also generate similar metrics for the applications 402, 404. In an embodiment, the metrics can be collected while a user is accessing specific applications that user experience is desired for monitoring. In another embodiment, the metrics can be enriched by triggering synthetic measurements in context of an inline transaction by the application 350 or cloud edge. The metrics can be tagged with metadata (user, time, app, etc.) and sent to a logging and analytics service for aggregation, analysis and reporting. Further, network administrators can get UEX reports from the cloud-based system 100. Due to the inline nature and the fact the cloud-based system 100 is an overlay (in-between users and services/applications), the cloud-based system 100 enables the ability to continuously capture user experience metric data and to historically log such data.

As such, a network administrator can have a long-term detailed view of the network and associated user experience.

Rate Limiting

The access control provides access to the cloud-based system 100 primarily through APIs either from a UI or scripted from custom management systems. The cloud-based system 100 includes a rate limiting policy that limits a number of calls that a client can make within a predetermined timeframe. In embodiments, the predetermined timeframe is a second, such that the number of calls that a client is limited to is on a per second basis. The rate limiting policy can be included as part of the policy 410 of FIG. 6, can be implemented as part of the central authority 152 of FIG. 2, and can also be implemented as part of the management system 120 of FIG. 1.

In embodiments, the rate limiting policy is defined as one or more of a global rate limiting policy for the cloud-based system 100, a customer rate limiting policy (for a specific customer), a user rate limiting policy (for a specific user(s)), and the like. In some embodiments that include multiple policies, the policies are prioritized, and applied in a priority order. Further, in some embodiments where a higher priority policy conflicts with a lower priority policy, the lower priority policy is ignored.

The rate limiting policy, including one or more general rate limiting policies, one or more customer rate limiting policies, one or more user rate limiting policies, and the like, are based on attributes of the client attempting to access the cloud-based system 100 via end point APIs. The attributes can include at least one of a username, instance, organization, resource, service, access region, and API associated with at least one of the client and the access request. In embodiments, the attributes also include one or more of a priority, IP address, and a policy scope (i.e. whether the policy is a general policy, a customer policy, a user policy, and the like). In some embodiments, the policy is limited to one per instance of a service. The attributes can be other items such as rate limit by "x" where x is a new attribute, an existing attribute, a user-defined attribute, etc.

Figure 8:
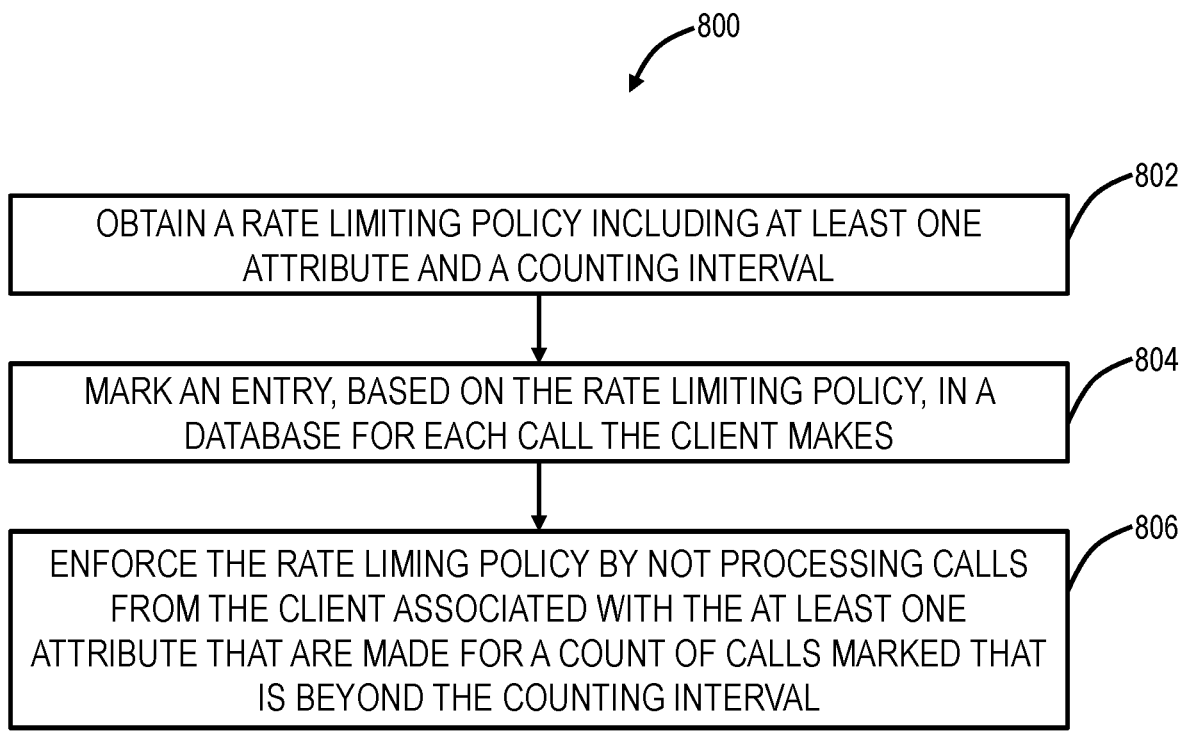
FIG. 8 is a flowchart of a method for limiting calls to access the cloud-based system.

FIG. 8 is a flowchart of a method 800 for limiting calls to access the cloud-based system 100. The method includes obtaining a rate limiting policy including at least one attribute and a counting interval at step 802. The counting interval defines the number of calls a client can make within the predetermined timeframe.

The method also includes marking an entry, based on the rate limiting policy, in a database for each call the client makes at step 804. In embodiments, an in-memory key-value database, such as a Remote Dictionary Server (Redis), is used to store and track the count of calls made by the client. In embodiments, step 804 is implemented where the count occurs from a first occurrence of the call, such that the rate limiting is performed in a sliding (rolling) log window. By implementing the count from the first occurrence of the call, leaking of calls across time boundaries can be prevented. In embodiments, the count is aggregated from a plurality of services provided by the cloud-based system 100 and for each end point API associated therewith. In some embodiments, each count recorded includes the attributes associated with the call, such as the username, customer, and resource associated with the call along with a timestamp of when the call was made.

The method 800 further includes enforcing the rate liming policy by not processing calls from the client associated with the at least one attribute that are made for a count of calls marked that is beyond the counting interval at step 806. In some embodiments, sorted sets and transaction commands, such as Redis sorted sets and transaction commands, are used to enforce the rate limit defined by the counting interval.

In some embodiments, the method includes updating the rate limiting policy based on a received request that includes the addition or removal of at least one attribute and a counting interval associated therewith. Thus, the rate limiting policy can be defined dynamically and can be applied to the cloud-based system 100 dynamically, without making any changes to the underlying code of the cloud-based system 100. By providing for dynamic changes to the rate limiting policy, the cloud-based system 100 can respond to threats and attacks quickly and efficiently to prevent brute force attacks and to block DoS attacks. In some embodiments, the method includes checking the limit and adding another entry to the database before the next call is received.

In embodiments, the method includes switching, temporarily, to a pure counting mode and not enforcing the call limits defined by the counting interval and recording all of the calls made to the APIs to determine a potential number of calls made to the APIs by clients.

In some embodiments, the rate limiting policy is applied by geographic regions and the counting and enforcing are implemented based on predetermined regions.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for limiting calls to access a cloud-based system, comprising:

obtaining a rate limiting policy including at least one attribute and a counting interval;

marking an entry, based on the rate limiting policy, in a database for each call the client makes; and enforcing the rate liming policy by not processing calls from the client associated with the at least one attribute that are made for a count of calls marked that is beyond the counting interval, wherein the rate limiting policy further includes at least one of a priority of the rate limiting policy, an Internet Protocol (IP) address, and a policy scope.

2. The method of claim 1, wherein the at least one attribute includes at least one of a username associated with a client, an instance, an organization associated with the client, a resource being requested, a service being requested, a geographical access region, and an Application Programming Interface (API) being requested.

3. The method of claim 1, wherein the rate limiting policy includes a general rate limiting policy that applies rate limits to the cloud-based system and at least one of a customer rate limiting policy that applies rate limits to a customer and associated clients of the customer and a user rate limiting policy that applies rate limits to a specific user.

4. The method of claim 1, further comprising dynamically updating the rate limiting policy based on a received request that includes the addition or removal of at least one attribute and a counting interval associated with the at least one attribute.

5. The method of claim 1, further comprising switching, temporarily, to a pure counting mode and not enforcing the call limits defined by the counting interval and recording all of the calls made to the APIs to determine a potential number of calls made to the APIs by clients of the cloud-based system.

6. The method of claim 1, wherein the count of the call occurs from a first occurrence of the call.

7. The method of claim 6, wherein the database comprises an in-memory key-value database and each entry is marked in a sliding log window.

8. A method for limiting calls to access a cloud-based system, comprising:

obtaining a rate limiting policy including at least one attribute and a counting interval;

marking an entry, based on the rate limiting policy, in a database for each call the client makes; and enforcing the rate liming policy by not processing calls from the client associated with the at least one attribute that are made for a count of calls marked that is beyond the counting interval, wherein the rate limiting policy includes a general rate limiting policy that applies rate limits to the cloud-based system and at least one of a customer rate limiting policy that applies rate limits to a customer and associated clients of the customer and a user rate limiting policy that applies rate limits to a specific user.

9. The method of claim 8, wherein the at least one attribute includes at least one of a username associated with a client, an instance, an organization associated with the client, a resource being requested, a service being requested, a geographical access region, and an Application Programming Interface (API) being requested.

10. The method of claim 8, wherein the rate limiting policy further includes at least one of a priority of the rate limiting policy, an Internet Protocol (IP) address, and a policy scope.

11. The method of claim 8, further comprising dynamically updating the rate limiting policy based on a received request that includes the addition or removal of at least one attribute and a counting interval associated with the at least one attribute.

12. The method of claim 8, further comprising switching, temporarily, to a pure counting mode and not enforcing the call limits defined by the counting interval and recording all of the calls made to the APIs to determine a potential number of calls made to the APIs by clients of the cloud-based system.

13. The method of claim 8, wherein the count of the call occurs from a first occurrence of the call.

14. The method of claim 13, wherein the database comprises an in-memory key-value database and each entry is marked in a sliding log window.

15. A method for limiting calls to access a cloud-based system, comprising:
    obtaining a rate limiting policy including at least one attribute and a counting interval;
    marking an entry, based on the rate limiting policy, in a database for each call the client makes;
    enforcing the rate liming policy by not processing calls from the client associated with the at least one attribute that are made for a count of calls marked that is beyond the counting interval; and
    dynamically updating the rate limiting policy based on a received request that includes the addition or removal of at least one attribute and a counting interval associated with the at least one attribute.

16. The method of claim 15, wherein the at least one attribute includes at least one of a username associated with a client, an instance, an organization associated with the client, a resource being requested, a service being requested, a geographical access region, and an Application Programming Interface (API) being requested.

17. The method of claim 15, wherein the rate limiting policy further includes at least one of a priority of the rate limiting policy, an Internet Protocol (IP) address, and a policy scope.

18. The method of claim 15, wherein the rate limiting policy includes a general rate limiting policy that applies rate limits to the cloud-based system and at least one of a customer rate limiting policy that applies rate limits to a customer and associated clients of the customer and a user rate limiting policy that applies rate limits to a specific user.

19. The method of claim 15, further comprising switching, temporarily, to a pure counting mode and not enforcing the call limits defined by the counting interval and recording all of the calls made to the APIs to determine a potential number of calls made to the APIs by clients of the cloud-based system.

20. The method of claim 15, wherein the count of the call occurs from a first occurrence of the call.

\* \* \* \* \*